(12) United States Patent
Bruce et al.

(10) Patent No.: US 7,290,075 B2
(45) Date of Patent: Oct. 30, 2007

(54) PERFORMING ARBITRATION IN A DATA PROCESSING APPARATUS

(75) Inventors: Alistair Crone Bruce, Marple (GB); Bruce James Mathewson, Papworth Everard (GB); Antony John Harris, Sheffield (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 11/431,650

(22) Filed: May 11, 2006

(65) Prior Publication Data

US 2006/0206645 A1 Sep. 14, 2006

Related U.S. Application Data

(62) Division of application No. 10/862,812, filed on Jun. 8, 2004, now Pat. No. 7,143,221.

(51) Int. Cl.
*G06F 13/14* (2006.01)
*G06F 13/36* (2006.01)
*H04L 12/00* (2006.01)
*G06F 3/00* (2006.01)

(52) U.S. Cl. ............... 710/113; 710/240; 710/316; 710/110; 709/208; 711/147; 370/362; 370/462

(58) Field of Classification Search ............ 710/33, 710/36–40, 107, 113, 305, 240, 62, 310, 316; 711/100, 154, 147–149; 709/208, 225, 229, 709/238, 253; 714/37; 713/502; 370/362, 370/462
See application file for complete search history.

(56) References Cited

U.S. PATENT DOCUMENTS

| | | | |
|---|---|---|---|
| 4,215,395 A | * | 7/1980 | Bunyard et al. ............ 700/5 |
| 4,449,183 A | | 5/1984 | Flahive et al. |
| 5,428,796 A | * | 6/1995 | Iskiyan et al. ............ 710/240 |
| 5,513,331 A | * | 4/1996 | Pawlowski et al. ............ 711/1 |
| 5,574,868 A | * | 11/1996 | Marisetty ............ 710/118 |
| 5,796,732 A | | 8/1998 | Mazzola et al. |
| 5,920,698 A | * | 7/1999 | Ben-Michael et al. ...... 709/224 |
| 6,002,675 A | | 12/1999 | Ben-Michael et al. |
| 6,097,705 A | * | 8/2000 | Ben-Michael et al. ...... 370/315 |

(Continued)

OTHER PUBLICATIONS

"Distributed packet processing in P2P networks" by Yao et al. (abstract only)□□Publication Date: Nov. 28-Dec. 2, 2005.*
"Analtsis of macro-dataflow dynamic scheduling on nonuniform memory access architectures" by M. Al-Mouhamad (abstract only) Publication Date: Aug. 1993.*

(Continued)

*Primary Examiner*—Gopal C. Ray
(74) *Attorney, Agent, or Firm*—Nixon & Vanderhye P.C.

(57) ABSTRACT

An apparatus for arbitration within a data processing apparatus between a plurality of transfers to be routed over a corresponding plurality of paths provided by an interconnect circuit. The plurality of paths include a shared connection, the data processing apparatus having a plurality of initiator logic elements for initiating transfers and a plurality of recipient logic elements for receiving transfers, for each transfer the corresponding path coupling the initiator logic element responsible for initiating that transfer with the recipient logic element destined to receive that transfer. The apparatus provides arbitration logic with an indication as to whether the ready signal from a storage element has been asserted, and employs the arbitration logic to select, in dependence on predetermined criteria including at least that indication, one of the plurality of transfers for routing via the shared connection.

13 Claims, 9 Drawing Sheets

U.S. PATENT DOCUMENTS

| | | | |
|---|---|---|---|
| 6,442,170 B1* | 8/2002 | Perlman et al. | 370/401 |
| 6,512,397 B1 | 1/2003 | Jacobson et al. | |
| 6,571,321 B2 | 5/2003 | Rowlands et al. | |
| 6,598,083 B1 | 7/2003 | Remer et al. | |
| 6,640,288 B2 | 10/2003 | Rowlands et al. | |
| 6,912,612 B2 | 6/2005 | Kapur et al. | |
| 6,970,966 B2* | 11/2005 | Gemelli et al. | 710/305 |
| 7,047,374 B2 | 5/2006 | Sah et al. | |
| 7,093,989 B2* | 8/2006 | Walmsley et al. | 400/62 |
| 7,096,137 B2* | 8/2006 | Shipton et al. | 702/106 |
| 2003/0101307 A1* | 5/2003 | Gemelli et al. | 710/305 |
| 2005/0177633 A1* | 8/2005 | Plunkett | 709/225 |
| 2006/0206645 A1* | 9/2006 | Bruce et al. | 710/240 |

OTHER PUBLICATIONS

E.A. Varvarigos et al, "The ready-to-go virtual circuit protocol: a loss-free protocol for multigigabit networks using FIFO buffers" (abstract only) Oct. 1997.

W. Peterson, "The VMEbus Handbook: A User's Guide to the VME64 and VME64x Bus Specifications" 1997, pp. 11, 30, 77-78 & 151-170.

* cited by examiner

PERFORMING ARBITRATION IN A DATA PROCESSING APPARATUS

This application is a Division of application Ser. No. 10/862,812, filed Jun. 8, 2004 (now U.S. Patent No. 7,143, 221 issued Nov. 28, 2006). The entire content of this application is incorporated herein by reference.

BACKGROUND OF THE INVENTION

1. Field of the Invention

The present invention relates to a data processing apparatus and method, and in particular to techniques for performing arbitration between a plurality of transfers to be routed over an interconnect circuit of a data processing apparatus.

2. Description of the Prior Art

It is known to provide a data processing apparatus having a plurality of logic elements that are interconnected via an interconnect circuit. Communication between the logic elements occurs via transfers which may be issued from one logic element (referred to herein as the initiator logic element) to another logic element (referred to herein as the recipient logic element) via a path provided by the interconnect circuit.

As data processing apparatus increase in complexity, the number of logic elements provided within the data processing apparatus increase, and this increases the complexity of the interconnect circuit. A typical interconnect circuit may provide a large number of paths for routing transfers between the various logic elements connected to the interconnect circuit, and it is often the case that a number of these paths will include a shared connection.

At any point in time, a shared connection can only be employed to route the transfer data of one transfer, and accordingly arbitration logic is often required in order to arbitrate between multiple requests to transfer data via the interconnect circuit, in order to ensure that for any shared connection in the interconnect circuit, only one initiator logic element is granted the right to use that shared connection at any point in time.

Protocols are typically defined in relation to the interconnect circuit to impose certain requirements on the format of the transfers routed via the interconnect circuit. Often, there is a requirement for some form of handshaking to take place between the initiator logic element and the recipient logic element during the transfer. For example, the AXI interface specification developed by ARM Limited, Cambridge, England, requires that an initiator logic element issues a valid signal when it wishes to initiate a transfer, and that this valid signal is held stable until the completion of a handshake that takes place when a ready signal is asserted by the recipient logic element. Whilst there is a requirement for the valid signal to be held stable until completion of the handshake (a valid signal conforming to this requirement sometimes being referred to as a "sticky" valid signal), the ready signal is not constrained in this way. Instead, the ready signal may be asserted and de-asserted in any clock cycle depending on the internal state of the recipient logic element. Indeed, some recipient logic elements may even wait for a valid signal to be asserted before they issue a ready signal.

The consequence of this is that the arbitration logic associated with the interconnect circuit cannot make use of the ready signal for arbitration. Instead, a typical arbitration scheme would select an initiator logic element to have access to the required path through the interconnect circuit based on that logic element having asserted its valid signal and some measure of that logic element's priority. Once a path has been chosen, the "sticky" valid rule mentioned earlier requires that this path is maintained until the transfer is completed by a handshake. During this potentially unbounded time, that selected path through the interconnect circuit is busy and cannot be used for routing between other logic elements. This can have a significant impact on the throughput of data through the interconnect circuit, particularly in instances where that path incorporates a shared connection.

It would hence be desirable to provide an improved technique for arbitration within a data processing apparatus.

SUMMARY OF THE INVENTION

Viewed from a first aspect, the present invention provides a method of arbitrating between a plurality of transfers to be routed over a corresponding plurality of paths provided by an interconnect circuit of a data processing apparatus, the plurality of paths including a shared connection, the data processing apparatus having a plurality of initiator logic elements for initiating transfers and a plurality of recipient logic elements for receiving transfers, for each transfer the corresponding path coupling the initiator logic element responsible for initiating that transfer with the recipient logic element destined to receive that transfer, at least one of the recipient logic elements that is destined to receive one of said transfers having a storage element associated therewith operable to temporarily store transfer data of that transfer, the storage element being operable to assert a ready signal if that storage element is available to store the transfer data, and the storage element being arranged such that once the ready signal is asserted that ready signal will not be de-asserted until said transfer data has been received by the storage element, the method comprising the steps of: (i) providing to arbitration logic an indication as to whether said ready signal has been asserted; and (ii) employing the arbitration logic to select, in dependence on predetermined criteria including at least said indication, one of said plurality of transfers for routing via the shared connection.

Within a typical data processing apparatus, a clock signal will be used to control the operation of the logic elements within the apparatus, and to control the transfer of signals between those logic elements via the interconnect circuit. When designing such an apparatus, regard will usually be taken of the target clock speed, i.e. operating frequency, that the apparatus will need to run at, since this will ultimately limit how much processing a particular logic element can perform in a single clock cycle, and how far a signal may pass along a path of the interconnect circuit in each clock cycle. Having regard to the issue of transferring signals over such paths, a designer may decide, having regard to the target clock speed, that it is appropriate to add one or more storage elements (also referred to herein as register slices) along a particular path, in order to separate that path into one or more path portions. In any one clock cycle, the signal then only needs to traverse the length of each path portion.

The inventors of the present invention realised that the presence of such storage elements could be used to alleviate the earlier-described problems associated with arbitration. In particular, a property that can readily be imposed upon such storage elements (given their relative simplicity) is a requirement that such a storage element does not wait for a valid signal to be asserted before it asserts a ready signal, and when such a storage element asserts a ready signal indicating that it is available to store transfer data, the storage element continues to assert that ready signal until the transfer data has been received (a ready signal having that property being referred to herein as a "sticky" ready signal).

With this requirement imposed upon any storage elements inserted within the apparatus, the method of the present invention provides an indication to the arbitration logic as to whether the ready signal of such a storage element has been asserted. Then, the arbitration logic is arranged to select, in dependence on predetermined criteria including at least that indication, one of the plurality of transfers for routing via the shared connection. Hence, in accordance with the present invention, the fact that a transfer may be destined for a recipient logic element that has a storage element associated therewith that has asserted its ready signal can be taken into account when deciding which transfer to select for routing via the shared connection. It will be appreciated that such a transfer is a good candidate for selection, since it is clear that if such a transfer is selected, that transfer will take place quickly, since the signals required to complete the handshaking process are already present. In particular, such a transfer should complete within a single clock cycle, hence avoiding any unnecessary stalling of other candidate transfers that may need to use that shared connection.

Accordingly, it will be appreciated that by employing the method of the present invention, a significant increase in the throughput of the interconnect circuit can be achieved.

It will be appreciated that the indication that the arbitration logic receives concerning whether the ready signal has been asserted by a storage element can be used in a variety of ways. However, in one embodiment the arbitration logic is operable to prioritise the plurality of transfers in order to select one of said plurality of transfers for routing via the shared connection and, if said ready signal has been asserted by the storage element, to enhance the priority of the transfer destined for the recipient logic element associated with that storage element prior to making the selection. In a simple implementation, the arbitration logic may be arranged to give such a transfer the highest priority, in effect bypassing any other predetermined criteria that may normally be considered by the arbitration logic when making the selection. However, it is envisaged that such an approach could cause transfers to recipient logic units that do not have such a storage element associated therewith to be delayed indefinitely in situations where a series of transfers are taking place to recipient logic elements that do have such storage elements associated therewith. Accordingly, in an alternative embodiment it is envisaged that, if a ready signal has been asserted by a particular storage element, then the priority of the transfer destined for the associated recipient logic element is enhanced, but that other predetermined criteria is still considered, and the enhancement of the priority is not in itself a guarantee that that particular transfer will be selected.

It will be appreciated that the invention is applicable in any data processing apparatus where at least one recipient logic element has a storage element associated therewith that can assert a sticky ready signal. However, in preferred embodiments, multiple of the recipient logic elements have a storage element associated therewith and the arbitration logic receives indications from each storage element as to whether their ready signal has been asserted. In such embodiments, for each storage element that has asserted its ready signal, the arbitration logic is operable to enhance the priority of the transfer destined for the recipient logic element associated with that storage element prior to making a selection.

It will be appreciated that the predetermined criteria applied by the arbitration logic to select one of the transfers for routing via the shared connection can take a variety of forms. In one embodiment, the arbitration logic is operable to apply an arbitration scheme to select one of said plurality of transfers for routing via the shared connection, the arbitration scheme comprising the steps of: (a) in a first iteration considering only those transfers whose recipient logic element has an associated storage element with an asserted ready signal; and (b) if no such transfers exist considering in a second iteration the plurality of transfers. The arbitration scheme may in one embodiment be a round-robin arbitration scheme. Such a two-stage arbitration approach has been found to provide a significant performance improvement in terms of both throughput and latency.

It will be appreciated that the predetermined criteria can be applied in a number of ways. However, in one embodiment it is the initiator logic elements responsible for initiating the plurality of transfers that are the subject of the predetermined criteria applied by the arbitration logic. Hence, considering the earlier example of a round-robin arbitration scheme, this scheme will increment through the initiator logic elements during each subsequent transfer, in said step (a) only those transfers whose recipient logic elements have an associated storage element with an asserted ready signal being considered, and then only if no such transfers exist will the round-robin scheme consider all of the initiator logic elements that are attempting to initiate a transfer (again applying a round-robin scheme to those initiator logic elements).

In one embodiment, each initiator logic element is operable to assert a valid signal when that initiator logic element wishes to initiate a transfer, and continues to assert the valid signal until a ready signal is received by that initiator logic element. Hence, in such embodiments, the ready signal is used to complete a handshake between the initiator logic element and the recipient logic element.

It will be appreciated that the interconnect circuit can be arranged in a variety of ways. However, in one embodiment, the interconnect circuit comprises a plurality of buses over which the plurality of paths are established, each bus providing a plurality of channels, and the shared connection existing in at least one of the channels. As an example, separate channels may be provided for the transfer of addresses, the transfers of write data, the transfers of read data, etc.

In one embodiment, the initiator logic elements are master logic elements operable to initiate transactions, each transaction comprising one or more transfers, and the recipient logic elements are slave logic elements operable to process the transactions. In one such embodiment, the shared connection may exist in at least one of a write address channel, a read address channel or a write data channel.

In an alternative embodiment, or in addition to the above described embodiment, the initiator logic elements may be slave logic elements operable to initiate transfers and the recipient logic elements are master logic elements, the transfers being initiated in response to transactions issued by the master logic elements. In one such embodiment, a shared connection may exist in at least one of a read data channel or a write response channel.

It will be appreciated that there are a number of ways in which the storage elements may be provided within the data processing apparatus. However, in one embodiment, each path comprises one or more path portions separated by said storage elements, the storage elements being located such that each path portion is traversable by the transfer data in one clock cycle. Hence, in such embodiments, the storage elements are provided in order to meet timing requirements for the data processing apparatus, and this is their primary function. In accordance with such embodiments, the fact that such storage elements issue a sticky ready signal is exploited in order to provide improved arbitration within the data processing apparatus in accordance with the earlier described arbitration techniques.

Viewed from a second aspect, the present invention provides a data processing apparatus comprising: an interconnect circuit operable to route a plurality of transfers over a corresponding plurality of paths provided by the interconnect circuit, the plurality of paths including a shared connection; a plurality of initiator logic elements for initiating transfers; a plurality of recipient logic elements for receiving transfers; for each transfer the corresponding path coupling the initiator logic element responsible for initiating that transfer with the recipient logic element destined to receive that transfer; at least one of the recipient logic elements that is destined to receive one of said transfers having a storage element associated therewith operable to temporarily store transfer data of that transfer, the storage element being operable to assert a ready signal if that storage element is available to store the transfer data, and the storage element being arranged such that once the ready signal is asserted that ready signal will not be de-asserted until said transfer data has been received by the storage element; arbitration logic operable to receive an indication as to whether said ready signal has been asserted and to select, in dependence on predetermined criteria including at least said indication, one of said plurality of transfers for routing via the shared connection.

BRIEF DESCRIPTION OF THE DRAWINGS

The present invention will be described further, by way of example only, with reference to preferred embodiments thereof as illustrated in the accompanying drawings, in which.

DESCRIPTION OF EMBODIMENTS

Figure 1:
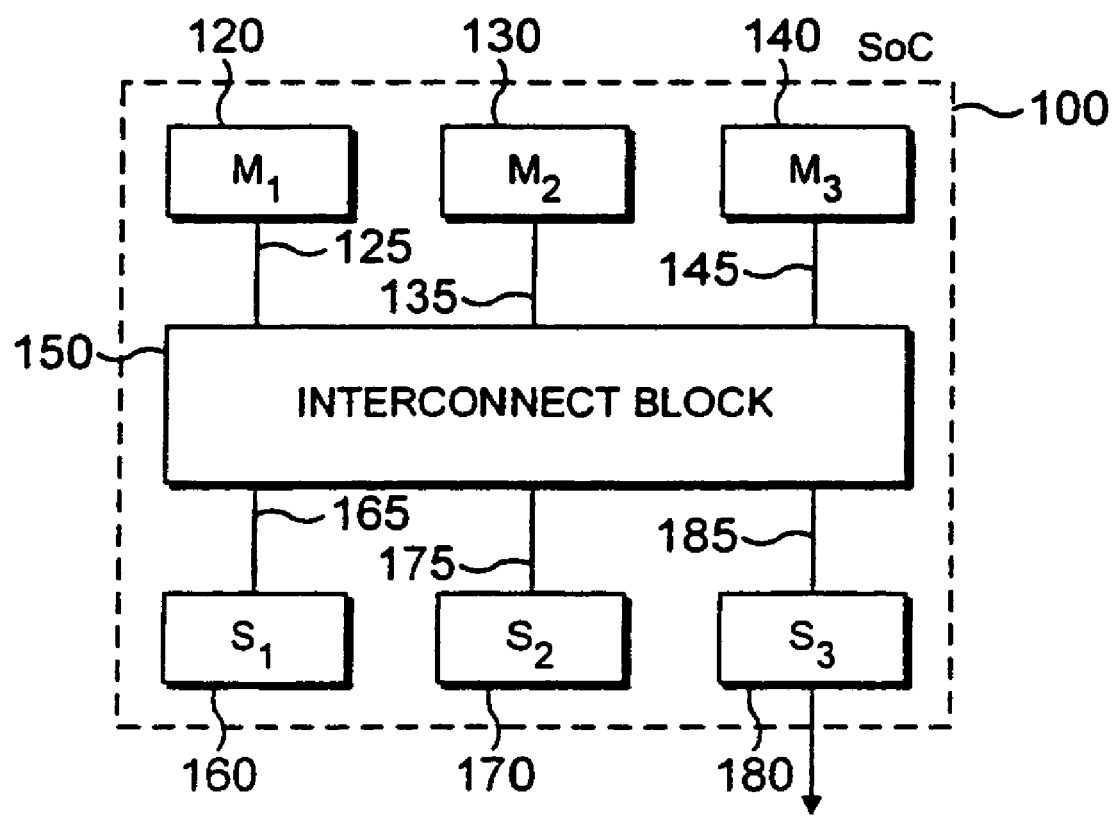
FIG. 1 is a block diagram illustrating the use of a bus interconnect block within a data processing apparatus.

FIG. 1 illustrates a data processing apparatus in the form of a System-on-Chip (SoC), which may be used within a device such as a personal organiser, a mobile phone, a television set-top box, etc. The SoC design 100 has a plurality of logic elements 120, 130, 140, 160, 170, 180 that are interconnected by an arrangement of buses. The actual interconnection of these buses is specified within an interconnect block or circuit 150. The interconnect block 150 includes a matrix of paths which provides for the interconnection of multiple bus master devices and bus slave devices within the SoC 100. Hence, each master device 120, 130, 140 may be connected to corresponding buses 125, 135, 145, respectively, whilst each slave device 160, 170, 180 may also be connected to corresponding buses 165, 175, 185, respectively, with the interconnect block 150 defining how these various buses are interconnected.

The buses interconnecting the various elements will typically operate in accordance with a specified bus protocol, and hence for example may operate in accordance with the "Advanced Microcontroller Bus Architecture" (AMBA) specification developed by ARM Limited, Cambridge, England.

Accordingly, it will be appreciated that the interconnect block 150 will describe a complex arrangement of interconnections between various master and slave devices. This complex arrangement may include a number of uni-directional channels of information. Within one or more of these channels there may be connections which are shared between multiple paths, and for which the interconnect block needs to perform arbitration in order to ensure that at any point in time only one transfer's data is being routed over such a shared connection.

Figure 2:
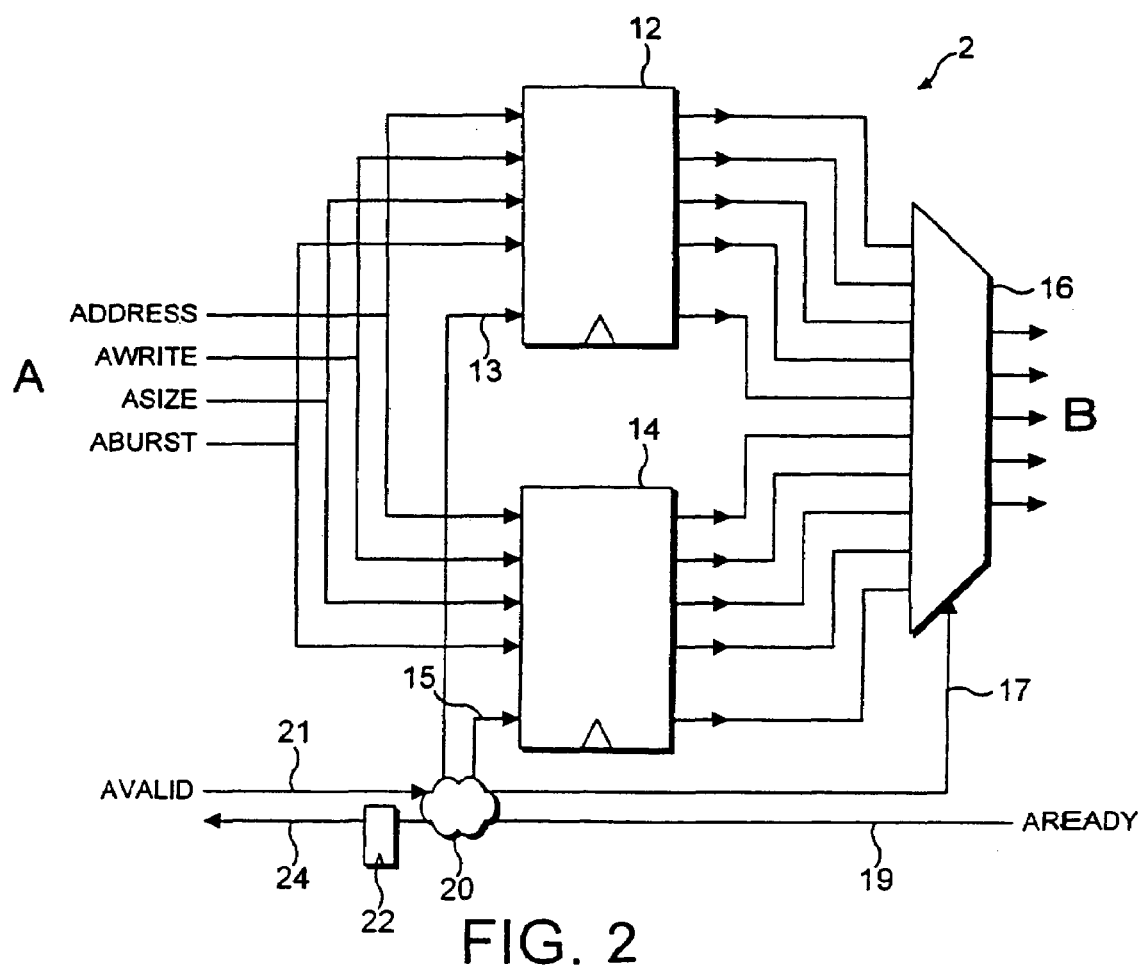
FIG. 2 is a diagram schematically illustrating an example implementation of a register slice.

In order to seek to meet a requirement for a chosen characteristic of the bus interconnect block, such as an improvement in a timing characteristic, one or more register slices may be inserted within the interconnect block. FIG. 2 is a diagram schematically illustrating an example implementation of a register slice in accordance with one embodiment of the present invention. Given a channel of information, also referred to herein as a group of signals, flowing from point A to point B, a register slice 2 can be used to insert a register between a source and destination on each of the information signals within the channel. Hence, with reference to FIG. 2, which illustrates a register slice inserted into an address channel, it can be seen that a transfer request specifying as a group of separate signals an address, an indication that the request is a write transfer request, the size of the data, and information about the burst size, can be temporarily stored within one of the register slice storage blocks 12, 14, prior to propagation on to the recipient logic element. In addition to the above signals, a valid signal will typically be issued indicating whether the other signals should be treated as valid. This valid signal will be received by the control logic 20, which also receives a ready signal from the recipient logic element, this ready signal being set to identify that the recipient logic element is ready to receive whatever signals are already stored within the register slice (i.e. within one of the register slice storage blocks 12, 14).

The register slice implementation of FIG. 2 further includes a register 22 inserted into the return path from the recipient logic element to the initiator logic element. This is useful, for example, where the return path for the ready signal is too long to traverse in a single clock cycle. However, with the aim of avoiding the performance penalty that would otherwise be incurred, the control logic 20 is arranged to predict the value of the ready signal (i.e. whether it will be set or not) in the next cycle, and store that predicted value in the register 22. In situations where at least one of the register slice storage blocks 12, 14 is empty, the control logic 20 is arranged to predict that the ready signal in the next cycle will be set, since even if that prediction is wrong, the register slice will have capacity to store in one of the two register slice storage blocks 12, 14 any signals passed to it from logic acting in dependence on that predicted value. Only if both register slice storage blocks currently contain valid data signals will the control logic predict that the ready signal in the next cycle will not be set, since in that instance it would not be able to receive any further input signals if the ready signal was indeed not set.

The control logic 20 is arranged to propagate the valid signal received over path 21 via path 13 or 15 to a selected one of the register slice storage blocks 12, 14, respectively, in dependence on the value of the received ready signal, and may for example apply a round-robin scheme where each consecutive received set of signals is sent to a different register slice storage block (e.g. first set of signals to storage block 12, second set of signals to storage block 14, third set of signals to storage block 12, etc). Further, the control logic 20 controls a multiplexer 16 via control path 17, so that the signals from the appropriate one of the storage blocks 12, 14 are output to ensure that the output from the register slice 2 provides the signals in the same order that they are received.

It will be appreciated that the register slice 2 illustrated in FIG. 2 has the effect of increasing the number of cycles required to pass signals from point A to point B, but with the advantage that it reduces the maximum length of path portion that must be covered in a single clock cycle, hence increasing the maximum clock frequency at which the design can operate. This has found to be particularly beneficial in pipelined systems, where the increase in number of cycles is more readily offset by the increase in maximum clock frequency achievable.

Whilst FIG. 2 illustrates the insertion of a register slice into an address channel, it will be appreciated that register slices may also be inserted into other channels, for example a write data channel or a read data channel, in order to allow the payload in such channels to be temporarily stored, thereby reducing the maximum length of path portion that must be covered by that payload in a single clock cycle.

Figure 3:
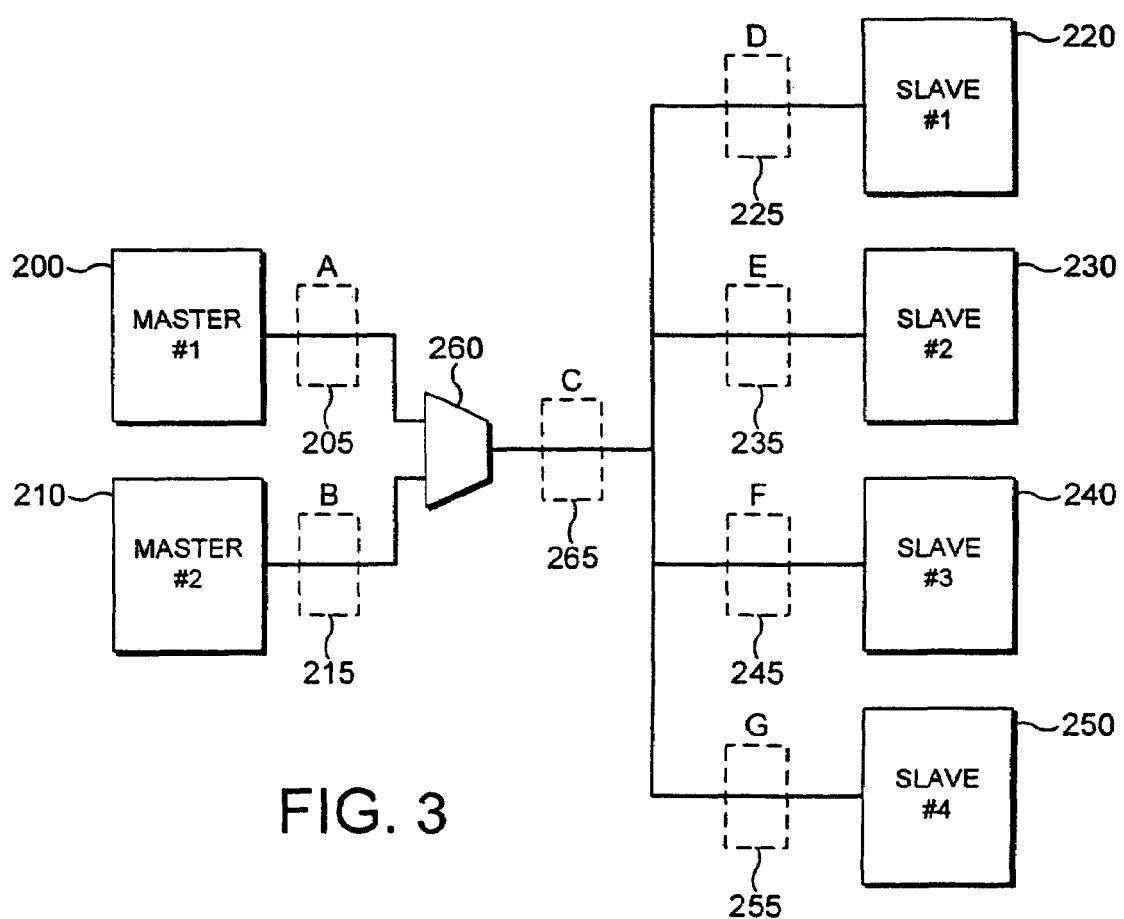
FIG. 3 is a block diagram illustrating the possible uses of register slices within a bus interconnect block in accordance with one embodiment.

A methodology and tool providing for the selective placement of such register slices within a bus interconnect block in order to meet the requirement for a chosen characteristic of the bus interconnect block (for example timing, power consumption, etc) is described in UK Patent Application No. 0313648.8, and will be discussed with reference to FIG. 3. FIG. 3 illustrates a two master and four slave system with a bus interconnect block located therebetween. As will be appreciated by those skilled in the art, a master logic element is used to initiate a transaction, with a selected slave logic element then processing the transaction. During the transaction, transfers may occur from the master device to the slave device, and optionally may also occur from the slave device to the master device (for example by returning data the subject of a read transaction).

In FIG. 3, the bus interconnect block has been kept simple to ease illustration, but it will be appreciated that in typical embodiments the bus interconnect block will be significantly more complex than the arrangement shown in FIG. 3. As can be seen from FIG. 3, a number of paths are provided by the bus interconnect block to enable master 1 200 or master 2 210 to communicate with any of the four slave devices 220, 230, 240, 250. When transfer requests are issued by the master devices, an arbiter will typically be used in order to determine which master should be granted access to the slave devices, and that arbiter will then send a control signal to the multiplexer 260 to control which transfer request is output to the slave devices. For clarity only the address path is shown in FIG. 3, but it will be appreciated that data paths will also be provided in both directions between the master and slave devices.

The boxes with dashed outlines 205, 215, 225, 235, 245, 255 and 265 show a number of potential sites for a register slice such as that illustrated in FIG. 2. It can be seen that the site 265 is a common site, as it intercepts the path between all master and slave devices. A register slice in this location will effectively place the combinatorial delays of the bus level multiplexer 260 behind a register. In accordance with the techniques described in UK Patent Application No. 0313648.8, a process is performed in order to identify potential sites such as the site 265, and determine whether it is appropriate to add a register slice at those sites. This process can be performed at any appropriate stage during the design process, for example at the RTL definition stage. As a result of this process register slices may be inserted at one or more of the locations indicated by the boxes 205, 215, 225, 235, 245, 255 and 265 shown in FIG. 3.

As is clear from FIG. 3, register slices located at any of the locations 205, 215, 225, 235, 245 or 255 are clearly associated with a corresponding logic element, i.e. a master logic element or a slave logic element.

Whilst the placement of register slices may be determined during the design process having regard to issues such as timing requirements, the fact that such register slices once incorporated into the design issue sticky ready signals can be utilised to provide improved arbitration, as will now be discussed in more detail with reference to the remaining figures.

Figure 4:
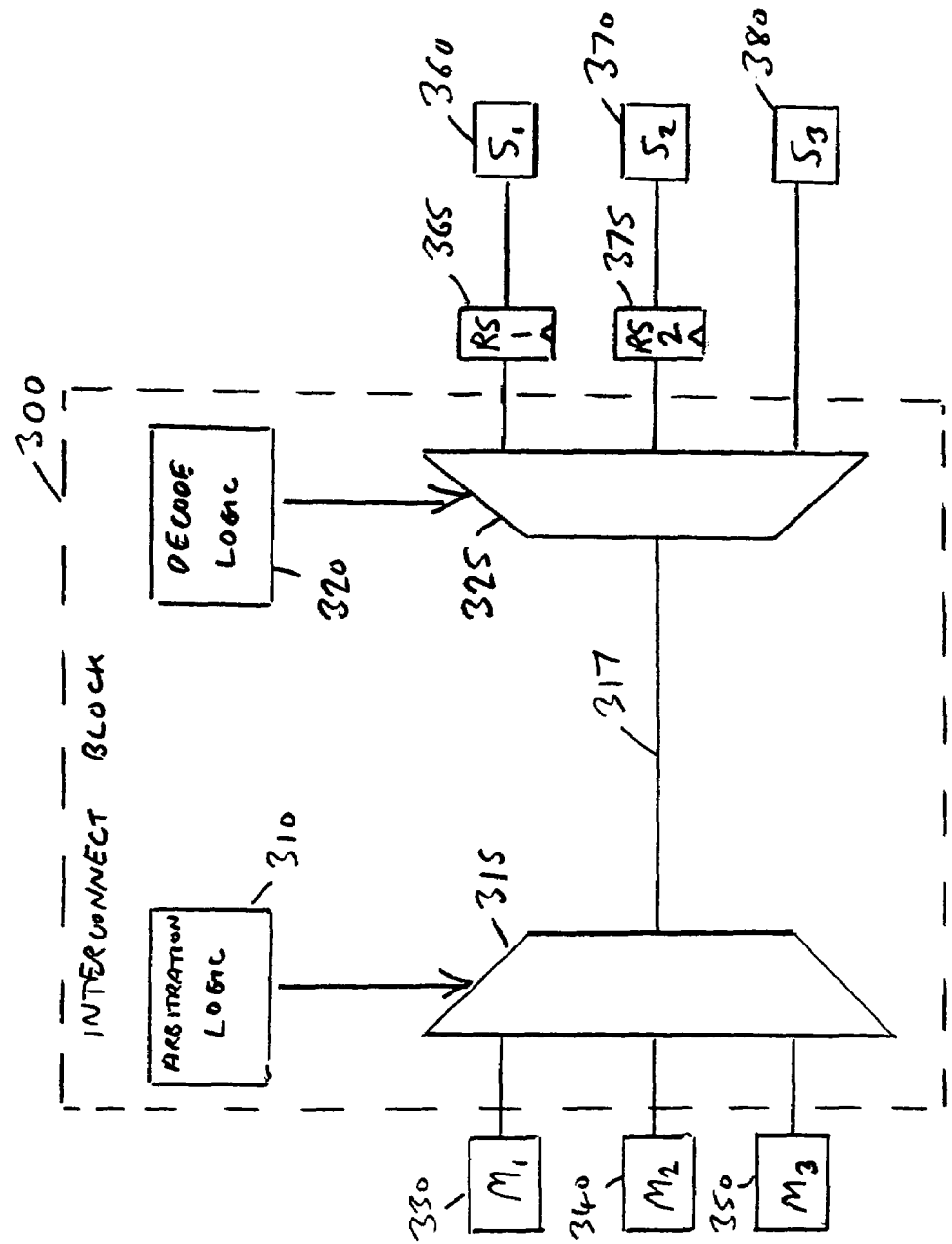
FIG. 4 is a block diagram illustrating logic provided within a simplified implementation of an interconnect block in accordance with one embodiment of the present invention.

FIG. 4 is a block diagram showing three master devices 330, 340 and 350 and three slave devices 360, 370, 380 coupled to an interconnect block 300. Slave devices 360, 370 have register slices 365, 375 associated therewith. In FIG. 4, these register slices 365, 375 have been considered to be external to the interconnect block 300, but it will be appreciated that they could equally well be considered to be within the interconnect block 300.

A very simple implementation of the interconnect block 300 is shown in FIG. 4 for ease of illustration, and in particular to illustrate the presence of a shared connection 317 for which arbitration needs to be provided. As with FIG. 3, only the address path is shown, but it will be appreciated that data paths will also typically be provided in both directions between the master and slave devices.

When a master wishes to initiate a transaction, it will issue a transfer request to send address information via the interconnect block to a chosen slave device, this slave device being determined with reference to the address information. In the presence of multiple transfer requests from different master devices 330, 340, 350, the arbitration logic 310 needs to arbitrate between the multiple transfers in order to select one of the transfers for routing over the interconnect block via the shared connection 317 to the required slave device 360, 370, 380. The arbitration logic 310 will hence send a control signal to the multiplexer 315 to route the transfer from the selected master on to the shared connection 317. Decode logic 320 will be arranged to determine from the address information which slave device is the target slave device for the transfer, and to send a control signal to the demultiplexer 325 to ensure that the transfer is routed to the appropriate slave device. In the case of the slave devices 360 and 370, the transfer will actually be routed in the first instance to the associated register slice 365 or 375 at which point the path through the interconnect block 300 can be released for reuse for another transfer. The transfer can then complete in a later clock cycle by transfer of the relevant data from the register slice 365 or 375 to the associated slave device 360 or 370, respectively.

However, in accordance with one embodiment of the present invention, the protocol employed by the interconnect block 300 requires handshaking to take place between the master device initiating the transfer and the slave device receiving the transfer, or in the case of the slave devices 360, 370 the associated register slices 365, 375 receiving the transfer. When the master device initiates the transfer, it will assert a valid signal, which it will then keep asserted until it receives an asserted ready signal over the return path of the interconnect block from the destination slave device/register slice. This process is illustrated in more detail with reference to FIGS. 5A and 5B. As shown in FIG. 5B, when an initiator logic element initiates a transfer, it will issue a payload over path 430, along with an associated valid signal over path 420, both of these paths being considered to exist within a channel provided by the interconnect block. The valid signal and payload must remain asserted until such time as the initiator logic element receives an asserted ready signal 425 over the return path of the channel. In the example illustrated in FIG. 4 where the address paths are shown, it will be appreciated that the initiator logic elements are master devices and the recipient logic elements are slave devices. However, when considering corresponding read data channels, it will be appreciated that the initiator logic elements will be the slave devices (or their associated register slices), and the recipient logic elements will be the master devices.

Figure 5A:
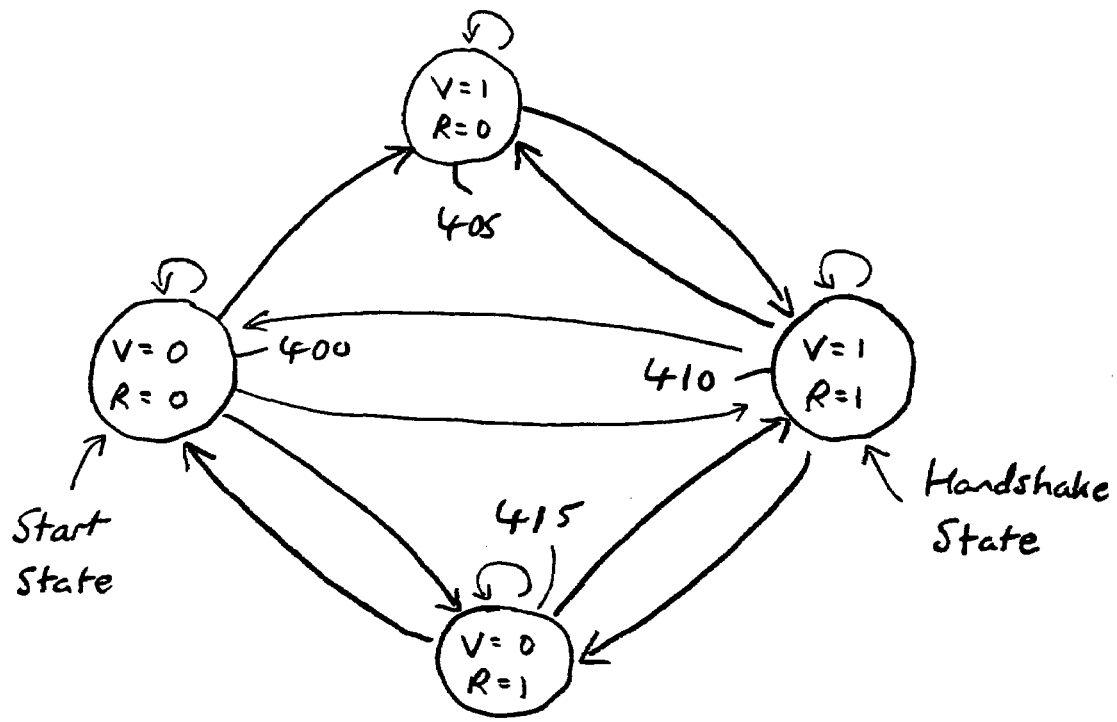
FIG. 5A is a state diagram showing transitions in state that can occur as the values of the valid and ready signals are changed.
Figure 5B:
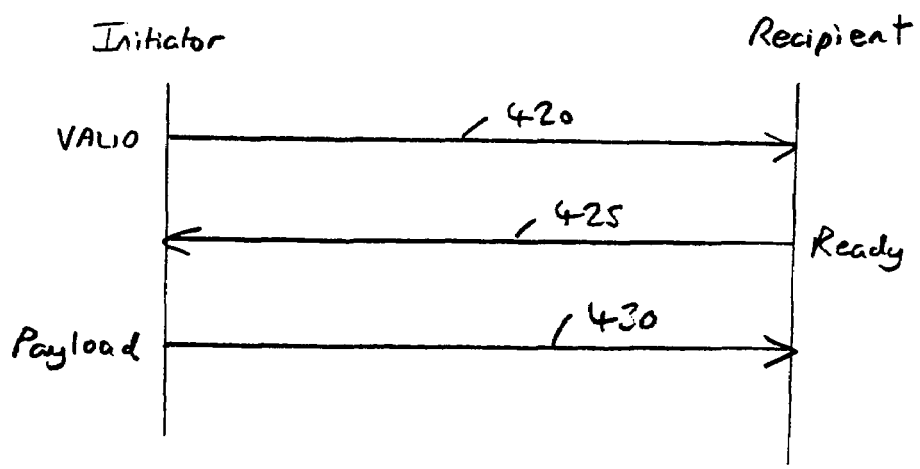
FIG. 5B is a diagram schematically illustrating the flow of signals between an initiator logic element and a recipient logic element within a particular channel of the interconnect block in accordance with one embodiment of the present invention.

FIG. 5A illustrates a state diagram showing how the states can transition dependent on different values of the valid and ready signals. In the example illustrated in FIG. 5A, it is assumed that a de-asserted valid or ready signal will have a logic zero value, whilst an asserted valid or ready signal will have a logic one value. However, it will be appreciated by those skilled in the art that in alternative embodiments the values assigned for asserted and de-asserted signals can be reversed. In an initial state 400, both the valid and ready signals are de-asserted. If the initiator logic element wishes to initiate a transfer, the state transitions to state 405 where the valid signal is asserted. At this point the ready signal can still be de-asserted. As soon as a ready signal is asserted by the target recipient logic element, the state transitions to state 410, where the handshake takes place, and the transfer is considered completed. It will be appreciated that if the valid and ready signals are asserted at the same time, the state can transition directly from state 400 to state 410. From state 410 the state can transition back to state 405 or directly back to state 400, and indeed can also transition to state 415, i.e. a state where the valid signal is de-asserted but the ready signal is still asserted. A typical recipient logic element can assert and de-assert its ready signal in any clock cycle depending on the internal state of the recipient logic element, and accordingly the transition between state 400 and 415 can occur in either direction. This should be contrasted with the transition from state 400 to 405, which can only occur in one direction, since once the valid signal is asserted it cannot be de-asserted again until an asserted ready signal has been received.

Figure 7A:
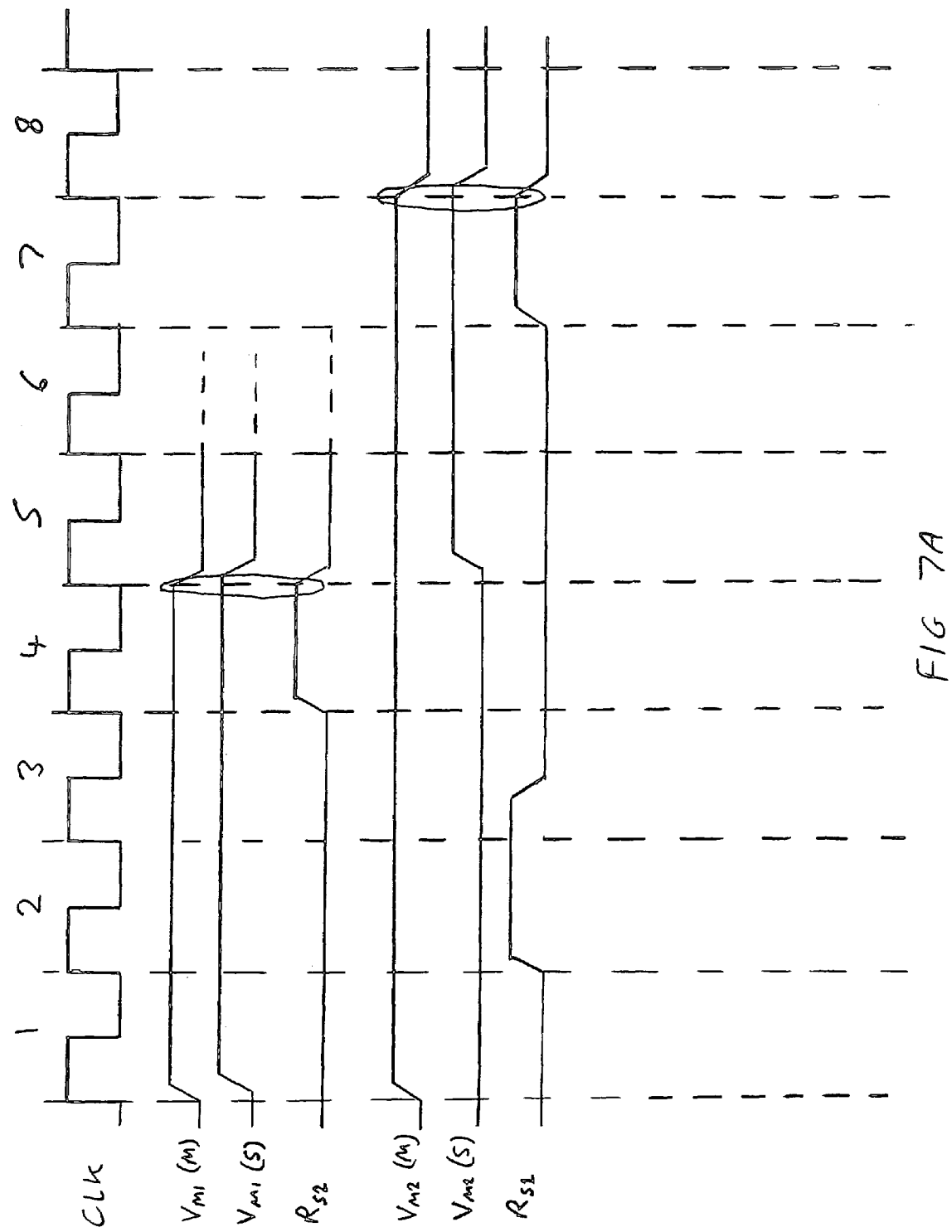
FIGS. 7A and 7B are timing diagrams illustrating various signals issued through the interconnect block of FIG. 4 for a particular pair of transfers, FIG. 7A assuming that the register slices illustrated in FIG. 4 are not present, and FIG. 7B illustrating the situation where those register slices are present and the ready signals from those register slices are used during arbitration.

However, in accordance with embodiments of the present invention, the register slices 365 and 375 are arranged such that when they assert a ready signal, that ready signal will remain asserted until the transfer data has been received by the register slice (i.e. the ready signal can be considered to be a sticky ready signal). In accordance with embodiments of the present invention, this property of the register slices is exploited to improve the efficiency of the arbitration performed by the arbitration logic 310 as is illustrated schematically with reference to FIGS. 7A and 7B. FIG. 7A is a timing diagram illustrating the interrelation of various signals issued by the data processing apparatus of FIG. 4, but assuming that the register slices 365, 375 are omitted. At the start of clock cycle 1, it is assumed that both the master device M1 330 and the master device M2 340 are seeking to initiate a transfer, and in particular the master device M1 330 is seeking to initiate a transfer to the slave device S2 370, whilst the master device M2 340 is seeking to initiate a transfer to the slave device S1 360. It is assumed that the arbitration logic 310 applies a round-robin arbitration scheme, and that at the start of clock cycle 1, it is M1's turn to be allocated access to the shared connection 317.

As shown in FIG. 7A, on the rising edge of the clock in cycle 1, the valid signals from both the master device M1 and the master device M2 are asserted (these signals being referred to as $V_{M1}(M)$ and $V_{M2}(M)$ in FIG. 7A. The arbitration logic 310 will then send a control signal to the multiplexer 315 to cause the signals from master M1 to be passed through the interconnect block to the slave device S2 370. Hence, as shown in FIG. 7A, the slave device 370 will receive a valid signal from the master 330 during clock cycle 1 (this being identified in FIG. 7A as $V_{M1}(S)$), but the corresponding valid signal from the master device 2 340 will not be routed through the interconnect block, and so will not be seen by the target slave device 1 360 (the valid signal as seen by the slave device 360 being illustrated in FIG. 7A as $V_{M2}(S)$.

As mentioned earlier, the valid signals are sticky valid signals, and hence will not be de-asserted until the ready signal from the target slave has been asserted. In the example in FIG. 7A, it is assumed that the slave device 2 370 will assert its ready signal on the rising edge of the clock in cycle 4, which allows the handshake to take place at the end of cycle 4, whereafter the valid signal from master M1 and the ready signal from slave S2 can be de-asserted. It should be noted that there is no requirement for these signals to be de-asserted, but for ease of illustration in the figures it is assumed that the valid and ready signals do become de-asserted following the handshake.

Once the handshake takes place at the end of cycle 4, the arbitration logic 310 is then able to re-arbitrate access to the shared connection 317, and accordingly during cycle 5 will grant access to the transfer being asserted by master 2 340. This will cause a valid signal to be received during cycle 5 by the slave device 1 360, as indicated in FIG. 7A by the signal $V_{M2}(S)$.

However, as illustrated in FIG. 7A, slave device 1 360 is not able to assert a ready signal at this time, and indeed only issues the ready signal at the beginning of cycle 7, thereby allowing the handshake to complete at the end of cycle 7. As shown in FIG. 7A, the slave device 1 360 did in fact assert a ready signal at the beginning of cycle 2, but the transfer could not take place at that time even though the master device 2 340 was issuing a valid signal, since the arbitration logic 310 had not granted master 2 340 access to the shared connection 317 at that time.

Figure 7B:
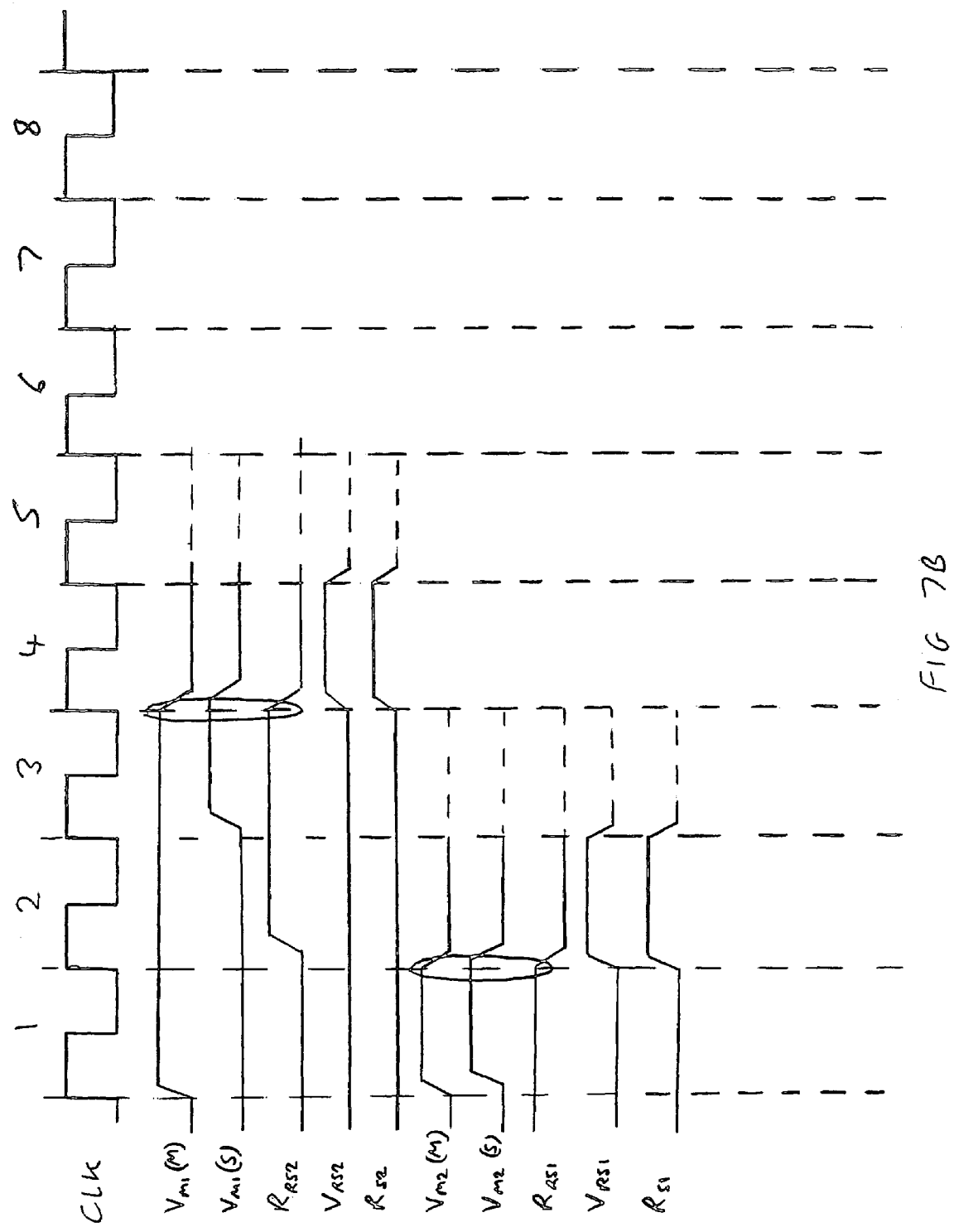

FIG. 7B is a timing diagram illustrating the same set of transfers, but in a situation where the register slices 365, 375 are incorporated, and the arbitration logic 310 is adapted to receive an indication when either of those register slices asserts a ready signal (as mentioned earlier such ready signals being sticky ready signals). Again, the arbitration logic 310 applies a round-robin scheme, and hence in the absence of any asserted ready signals from the register slices would allow the transfers to be routed through the interconnect block in the same order as that shown earlier with reference to FIG. 7A. However, in this example, it is assumed that on the rising edge of the first clock cycle the register slice 1 365 has asserted a ready signal, whilst the register slice 2 375 has not. In this case, the arbitration logic is arranged to instead allow the master device 2 340 to have access to the shared connection 317 instead of the master device 1 330, given that the register slice 1 365 is ready to receive the transfer to be issued by the master device 2 340. Hence, as shown in FIG. 7B, the valid signal $V_{M2}(S)$ as presented to the register slice 1 365 is asserted during the first clock cycle, and given the asserted ready signal ($R_{RS1}$) the handshake completes at the end of cycle 1. In exactly the same way as that illustrated in FIG. 7A, it is assumed that the slave device 1 360 asserts a ready signal at the start of cycle 2. Since the register slice 1 365 can also propagate on a valid signal ($V_{RS1}$) at the start of cycle 2, given that it now contains the transfer from master 2 340, this transfer can be passed from the register slice 1 365 to the slave device 1 360 during the second clock cycle.

Meanwhile, during the second clock cycle the ready signal ($R_{RS2}$) from the register slave 2 375 is asserted. On the rising edge of the start of the third clock cycle, the arbitration logic now allows the transfer from master 1 330 to be routed over the shared connection 317, and hence the register slice 2 375 receives an asserted valid signal (referred to in FIG. 7B as the $V_{M1}(S)$ signal) during the third clock cycle, thereby allowing the handshake to take place at the end of the third cycle. It will be appreciated that, depending on the number of cycles needed for the arbitration logic, master 1 330 may gain access to the bus in cycle 2 rather than cycle 3 as shown.

In exactly the same way a shown in FIG. 7A, the slave device 2 370 asserts a ready signal at the beginning of cycle 4. In addition, since the register slice 2 375 has by this time received the transfer data, it can assert a valid signal ($V_{RS2}$) at the start of cycle 4, thereby allowing the data to be routed to the slave device 2 370 during cycle 4.

Hence, by comparison of FIGS. 7A and 7B, it can be seen that with both approaches the transfer from the master 1 device 330 to the slave device 2 370 occurs at exactly the same time, i.e. at the end of cycle 4, but that in accordance with the technique illustrated in FIG. 7B, a further transfer via the interconnect block has occurred in the interim period, this not being possible with the approach of FIG. 7A due to the shared connection 317 being tied up by the transfer from the master device 1 330 awaiting the ready signal from the destination slave device 2 370. Accordingly, it can be seen that the techniques of the preferred embodiment of the present invention enable the throughput through the interconnect block 300 to be significantly improved, by taking advantage during arbitration of a knowledge of the sticky ready signals as issued by the register slices.

Figure 6A:
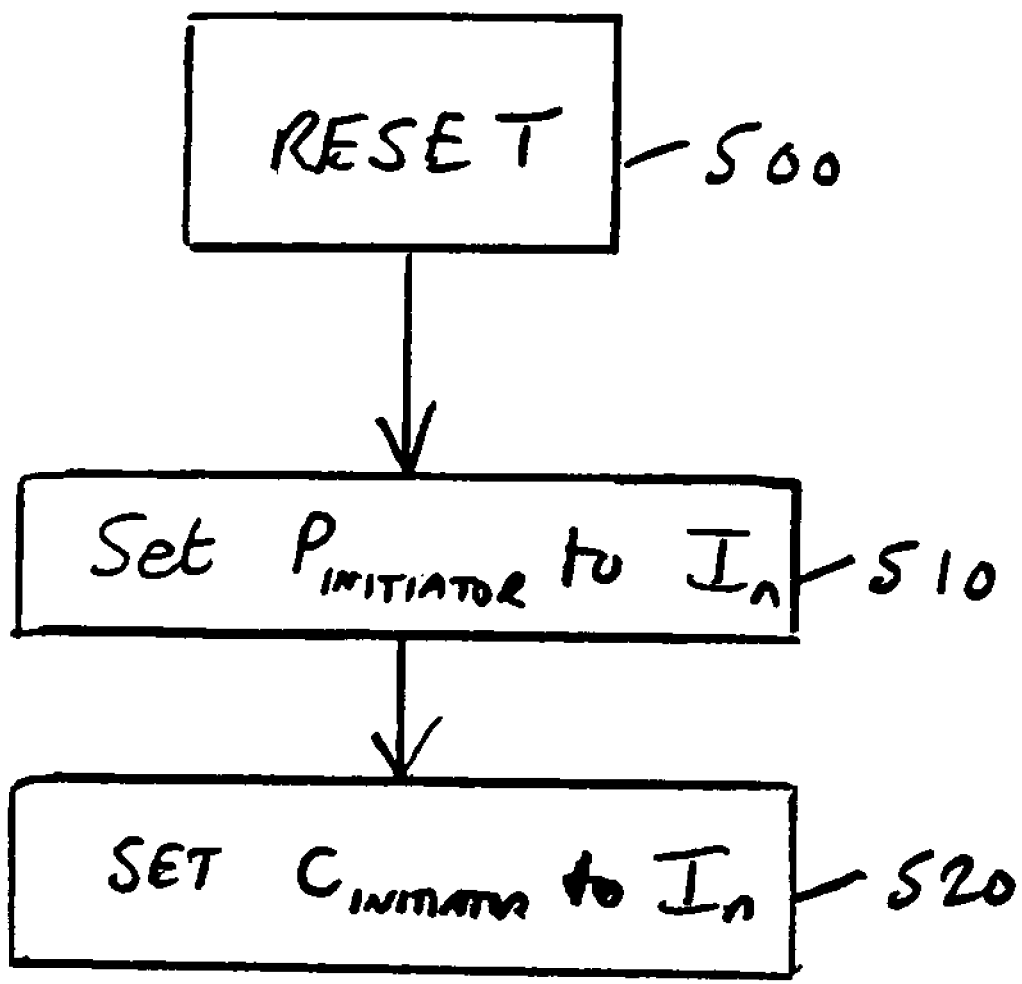
FIGS. 6A and 6B are flow diagrams illustrating an arbitration scheme applied by the arbitration logic of the interconnect block in accordance with one embodiment of the present invention.
Figure 6B:
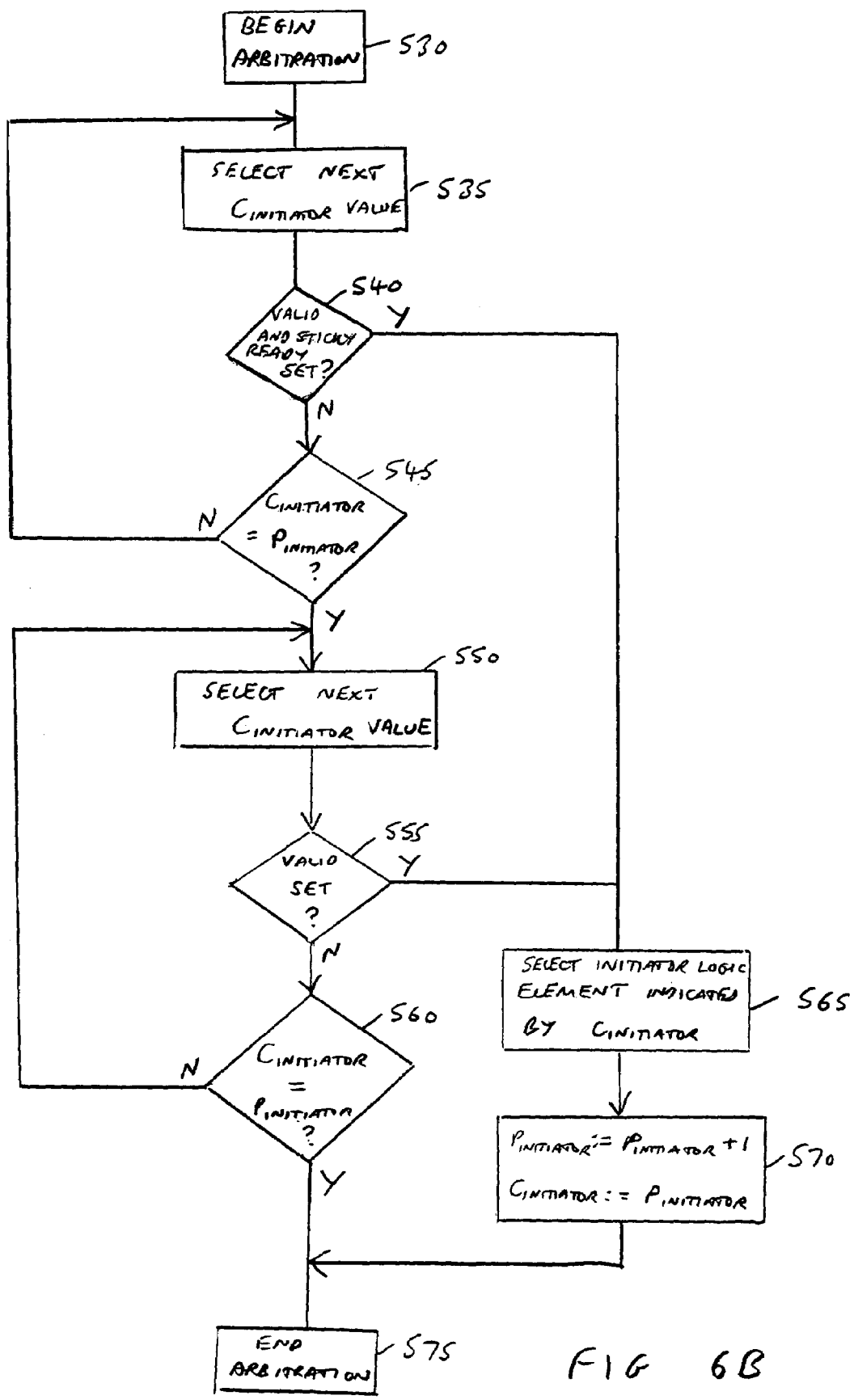

FIGS. 6A and 6B are flow diagrams illustrating the arbitration process performed in one embodiment of the present invention within the arbitration logic 310. Following a reset at step 500, the process proceeds to step 510, where a variable $P_{INITIATOR}$ is set to a value $I_n$, $I_n$ being the pointer to the last initiator logic element connected to the interconnect block. Hence, with reference to FIG. 4, where there are three initiator logic elements 330, 340, 350, it can be seen that $I_n$ will point to the master device 3 350. Then, at step 520, a further variable $C_{INITIATOR}$ is also set to $I_n$.

As then shown in FIG. 6B, when the arbitration logic 310 needs to begin arbitration at step 530, it proceeds to step 535, where the next value of the variable $C_{INITIATOR}$ is selected. It is assumed that a round-robin scheme is applied, and accordingly it will be appreciated that at this point the next value of the $C_{INITIATOR}$ variable will be a pointer to the master device 1 330.

The process then proceeds to step 540, where it is determined whether both the master device 330 is asserting a valid signal (i.e. has a transfer to initiate) and the target slave device (as indicated by the address information) has a register slice associated therewith with an asserted sticky ready signal. If it is, then the process branches directly to step 565, where the initiator logic element indicated by the current value of the $C_{INITIATOR}$ variable is selected for access to the interconnect block, and the appropriate control signal is sent from the arbitration logic 310 to the multiplexer 315 to cause that initiator element's transfer to be routed over the interconnect block. Next, at step 570, the variable $P_{INITIATOR}$ is incremented by one and the variable $C_{INITIATOR}$ is set equal to the value of $P_{INITIATOR}$, in preparation for the next time the arbitration routine of FIG. 6B is invoked. Then, at step 575 the arbitration process ends.

If at step 540 it is determined that either the master device identified by the value of $C_{INITIATOR}$ does not have a valid signal asserted or, if it does have a valid signal asserted, the destination device does not have a register slice associated therewith with an asserted ready signal, then the process proceeds to step 545, where it is determined whether the value of $C_{INITIATOR}$ is equal to the value of $P_{INITIATOR}$. If it is not, then this implies that there are still initiator logic elements to consider, and accordingly the process returns to step 535 to select the next $C_{INITIATOR}$ value. However, if the value of $C_{INITIATOR}$ does equal the value of $P_{INITIATOR}$, then this means that each of the initiator logic elements, 330, 340, 350 have been considered by the steps 535, 540, and hence the process proceeds to step 550.

Steps 550, 555 and 560 are analogous to steps 535, 540 and 545, but at step 555 the only determination made is whether the initiator logic element indicated by the current value of $C_{INITIATOR}$ has a valid signal set (i.e. has a transfer to initiate). If it does, then the process branches to step 565 to cause the initiator logic element to be selected so that its transfer can be routed over the interconnect block, and then at step 570 the variable $P_{INITIATOR}$ is incremented by one and the variable $C_{INITIATOR}$ is set equal to the value of $P_{INITIATOR}$.

If at step 560 it is determined that the value of $C_{INITIATOR}$ is equal to the value of $P_{INITIATOR}$, then this indicates that all of the initiator logic elements 330, 340, 350 have been considered by the steps 550, 555, and accordingly the process proceeds to step 575 without selecting any initiator logic element. This path is required, for example, if a particular implementation of the interconnect block causes the arbitration logic 310 to perform the arbitration process of FIG. 6B once every clock cycle, irrespective of whether there is actually a transfer to be sent over the interconnect block.

As will be appreciated from the above description of embodiments of the present invention, the embodiments of the present invention make use of the side effect of register slice insertion, namely the presence of sticky ready signals from the register slices, to allow push/pull arbitration in the interconnect block, using both the valid and ready signals. This allows the transfer to complete within a single cycle with no unnecessary stalling of other candidate routes, and hence can significantly improve the throughput through the interconnect circuit. This is important since it is often the case that during synthesis of the an interconnect implementation, propagation delays limit the maximum frequency at which the implementation can be clocked.

It has been found that this technique is particularly beneficial when used in association with interconnection fabric generation schemes such as those disclosed in UK Patent Application No. 0313648.8, which automatically insert register slices when needed during the design process, since such schemes can be arranged to adjust the arbitration algorithm at the same time, by arranging that the arbitration algorithm receives information about when such register slices have asserted their ready signals, and takes that information into account when performing arbitration.

Embodiments of the present invention can lead to an increase in performance in both throughput and latency.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
   an interconnect circuit operable to route a plurality of transfers over a corresponding plurality of paths provided by the interconnect circuit, the plurality of paths including a shared connection;
   a plurality of initiator logic elements for initiating transfers;
   a plurality of recipient logic elements for receiving transfers;
   for each transfer the corresponding path coupling the initiator logic element responsible for initiating that transfer with the recipient logic element destined to receive that transfer;
   at least one of the recipient logic elements that is destined to receive one of said transfers having a storage element associated therewith operable to temporarily store transfer data of that transfer, the storage element being operable to assert a ready signal if that storage element is available to store the transfer data, and the storage element being arranged such that once the ready signal is asserted that ready signal will not be de-asserted until said transfer data has been received by the storage element;
   arbitration logic operable to receive an indication as to whether said ready signal has been asserted and to select, in dependence on predetermined criteria including at least said indication, one of said plurality of transfers for routing via the shared connection.

2. A data processing apparatus as claimed in claim 1, wherein the arbitration logic is operable to prioritise the plurality of transfers in order to select one of said plurality of transfers for routing via the shared connection and, if said ready signal has been asserted by the storage element, to enhance the priority of the transfer destined for the recipient logic element associated with that storage element prior to making the selection.

3. A data processing apparatus as claimed in claim 1, wherein multiple of the recipient logic elements have a storage element associated therewith and the arbitration logic is operable to receive an indication as to whether said ready signal has been asserted for each storage element.

4. A data processing apparatus as claimed in claim 3, wherein the arbitration logic is operable to prioritise the plurality of transfers in order to select one of said plurality of transfers for routing via the shared connection and, for each storage element that has asserted its ready signal, to enhance the priority of the transfer destined for the recipient logic element associated with that storage element prior to making the selection.

5. A data processing apparatus as claimed in claim 4, wherein the arbitration logic is operable to apply an arbitration scheme to select one of said plurality of transfers for routing via the shared connection, the arbitration scheme operable:
   (a) in a first iteration to consider only those transfers whose recipient logic element has an associated storage element with an asserted ready signal; and
   (b) if no such transfers exist to consider in a second iteration the plurality of transfers.

6. A data processing apparatus as claimed in claim 1, wherein the predetermined criteria is applied in respect of the initiator logic elements responsible for initiating the plurality of transfers.

7. A data processing apparatus as claimed in claim 1, wherein each initiator logic element is operable to assert a valid signal when that initiator logic element wishes to initiate a transfer, and continues to assert the valid signal until a ready signal is received by that initiator logic element.

8. A data processing apparatus as claimed in claim 1, wherein the interconnect circuit comprises a plurality of buses over which the plurality of paths are established, each bus providing a plurality of channels, and the shared connection existing in at least one of the channels.

9. A data processing apparatus as claimed in claim 1, wherein the initiator logic elements are master logic elements operable to initiate transactions, each transaction comprising one or more transfers, and the recipient logic elements are slave logic elements operable to process the transactions.

10. A data processing apparatus as claimed in claim 9, wherein the interconnect circuit comprises a plurality of buses over which the plurality of paths are established, each bus providing a plurality of channels, and the shared connection existing in at least one of a write address channel, a read address channel or a write data channel.

11. A data processing apparatus as claimed in claim 1, wherein the initiator logic elements are slave logic elements operable to initiate transfers and the recipient logic elements are master logic elements, the transfers being initiated in response to transactions issued by the master logic elements.

12. A data processing apparatus as claimed in claim 11, wherein the interconnect circuit comprises a plurality of buses over which the plurality of paths are established, each bus providing a plurality of channels, and the shared connection existing in at least one of a read data channel or a buffered response channel.

13. A data processing apparatus as claimed in claim 1, wherein each path comprises one or more path portions separated by said storage elements, the storage elements being located such that each path portion is traversable by the transfer data in one clock cycle.

* * * * *